(12) United States Patent
Spooner et al.

(10) Patent No.: US 12,265,171 B2
(45) Date of Patent: Apr. 1, 2025

(54) MOBILE SIGNAL BASED BUILDING FOOTPRINTS

(71) Applicant: BILLUPS, INC., Lake Oswego, OR (US)

(72) Inventors: Shawn Spooner, Beaverton, OR (US); Chen Chen, Lake Oswego, OR (US)

(73) Assignee: Billups LLC, Lake Oswego, OR (US)

( * ) Notice: Subject to any disclaimer, the term of this patent is extended or adjusted under 35 U.S.C. 154(b) by 0 days.

(21) Appl. No.: 18/421,391

(22) Filed: Jan. 24, 2024

(65) Prior Publication Data

US 2024/0159860 A1    May 16, 2024

Related U.S. Application Data

(63) Continuation of application No. 17/951,717, filed on Sep. 23, 2022, now Pat. No. 11,914,065, which is a continuation of application No. 16/714,115, filed on Dec. 13, 2019, now Pat. No. 11,486,960.

(51) Int. Cl.

| | |
|---|---|
| *G01S 5/14* | (2006.01) |
| *G01S 5/02* | (2010.01) |
| *H04W 4/02* | (2018.01) |
| *H04W 4/029* | (2018.01) |
| *H04W 4/33* | (2018.01) |
| *H04W 8/08* | (2009.01) |
| *H04W 64/00* | (2009.01) |

(52) U.S. Cl.
CPC ............ *G01S 5/145* (2013.01); *G01S 5/0273* (2013.01); *H04W 4/023* (2013.01); *H04W 4/029* (2018.02); *H04W 4/33* (2018.02); *H04W 8/08* (2013.01); *H04W 64/003* (2013.01); *H04W 64/006* (2013.01)

(58) Field of Classification Search
CPC ........ G01S 5/145; G01S 5/0273; H04W 4/33; H04W 4/029; H04W 4/023; H04W 64/003; H04W 64/006
USPC .......................................................... 342/464
See application file for complete search history.

(56) References Cited

U.S. PATENT DOCUMENTS

| | | |
|---|---|---|
| 8,395,968 B2 | 3/2013 | Vartanian |
| 8,712,686 B2 | 4/2014 | Bandyopadhyay |
| 8,996,035 B2 | 3/2015 | Busch |

(Continued)

FOREIGN PATENT DOCUMENTS

| | | | | |
|---|---|---|---|---|
| CA | 2695841 A1 | 2/2009 | | |
| CN | 109059942 A | * 12/2018 | ............. | G01C 21/32 |

(Continued)

OTHER PUBLICATIONS

European Search Report for European Application No. EP 20 89 9956.5 mailed Jul. 17, 2023.

(Continued)

*Primary Examiner* — Harry K Liu
(74) *Attorney, Agent, or Firm* — Lempia Summerfield Katz LLC

(57) ABSTRACT

Recent decades have brought tremendous advances in communication systems which have given rise to the global proliferation of smartphones and other mobile communication systems. A signal processing system implements technical solutions for determining building footprints from inputs including signal data associated with mobile communication devices.

20 Claims, 6 Drawing Sheets

(56) References Cited

U.S. PATENT DOCUMENTS

| | | |
|---|---|---|
| 9,429,434 B2 | 8/2016 | O'neill |
| 9,733,091 B2 | 8/2017 | Kordari |
| 2008/0281687 A1 | 11/2008 | Hurwitz |
| 2009/0043504 A1 | 2/2009 | Bandyopadhyay et al. |
| 2011/0099046 A1 | 4/2011 | Weiss |
| 2012/0100867 A1 | 4/2012 | Liang |
| 2012/0130632 A1 | 5/2012 | Bandyopadhyay et al. |
| 2013/0077819 A1 | 3/2013 | Du et al. |
| 2013/0226857 A1 | 8/2013 | Shim |
| 2014/0278060 A1 | 9/2014 | Kordari |
| 2016/0170414 A1* | 6/2016 | Chen .................. G01C 21/3841 |
| | | 701/27 |
| 2016/0195400 A1 | 7/2016 | Young et al. |
| 2018/0040011 A1 | 2/2018 | Milton |
| 2018/0067187 A1 | 3/2018 | Oh |
| 2018/0213363 A1 | 7/2018 | Kim et al. |
| 2019/0050645 A1 | 2/2019 | Hentz et al. |
| 2019/0320292 A1 | 10/2019 | Knebl et al. |
| 2020/0045668 A1* | 2/2020 | Dormody ................ H04W 4/33 |
| 2022/0067233 A1 | 3/2022 | Blackwell et al. |

FOREIGN PATENT DOCUMENTS

| | | | |
|---|---|---|---|
| CN | 109769201 A | 5/2019 | |
| CN | 112013844 A | 12/2020 | |
| EP | 3137918 B1 * | 2/2019 | ............ G01S 19/13 |
| GB | 2570853 A | 8/2019 | |
| WO | 2015097480 A1 | 7/2015 | |
| WO | 2016066987 A1 | 5/2016 | |
| WO | 2017180033 A1 | 10/2017 | |
| WO | WO-2018176952 A1 * | 10/2018 | ............... G01S 5/02 |
| WO | 2019006189 A1 | 1/2019 | |
| WO | WO-2020221575 A1 * | 11/2020 | ........... G06F 18/217 |

OTHER PUBLICATIONS

Gu, Yanlei, et al. "SLAM with 3dimensional-GNSS." 2016 IEEE/ION Position, Location and Navigation Symposium (PLANS). IEEE, 2016. pp. 190-197.

International Search Report and the Written Opinion for International Patent Application PCT/US2020/63191 mailed Feb. 24, 2021.

\* cited by examiner

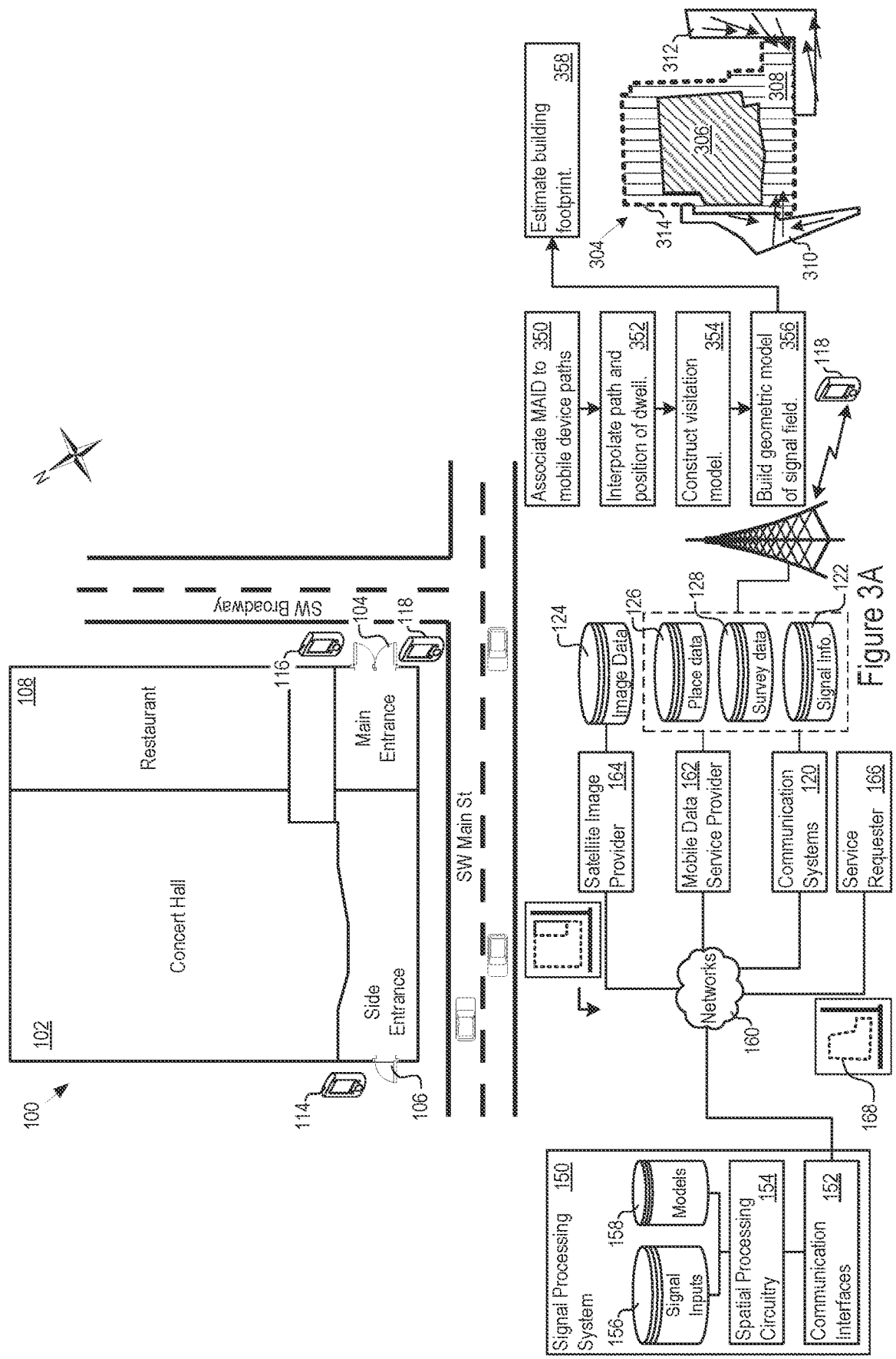

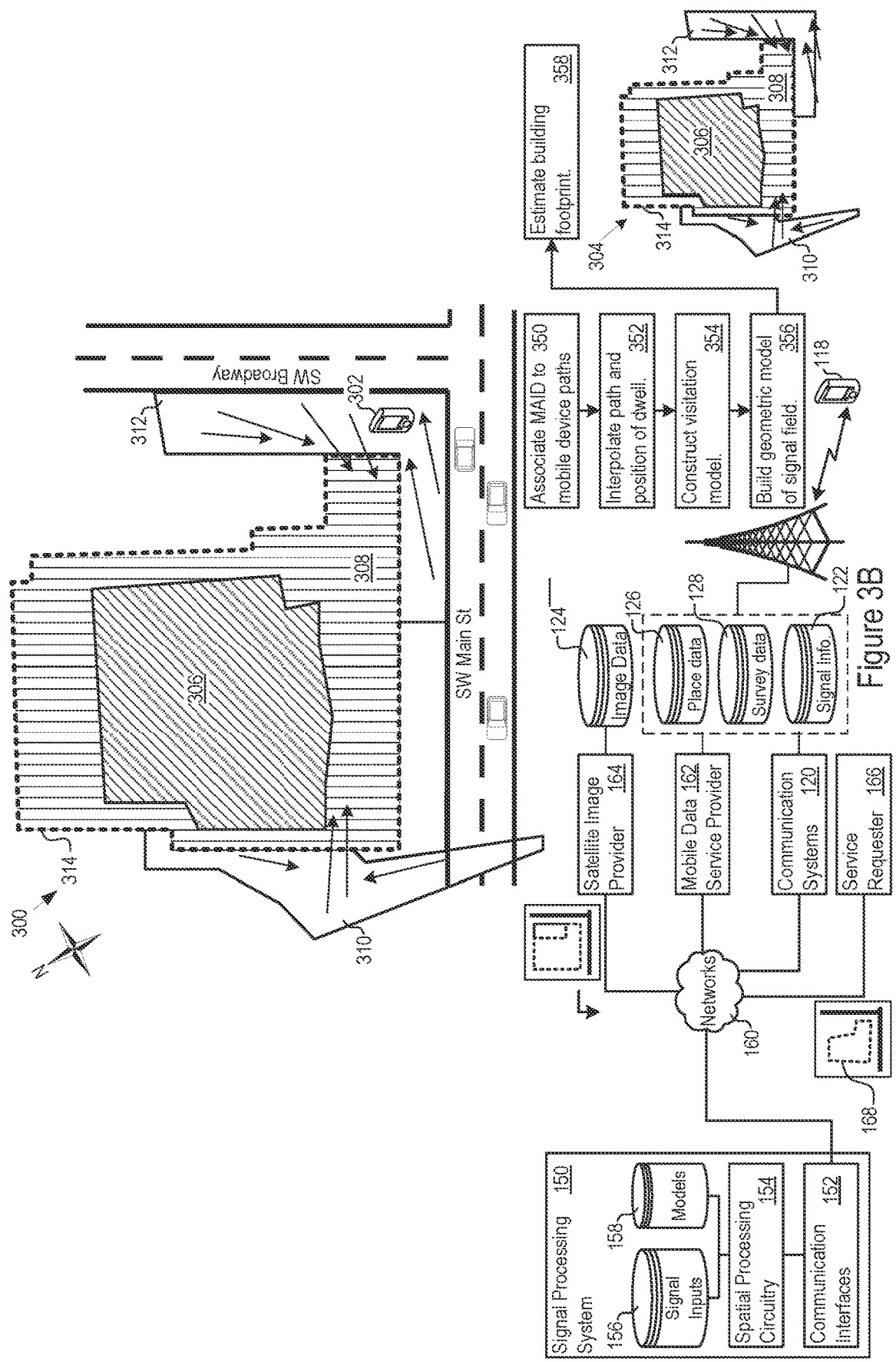

MOBILE SIGNAL BASED BUILDING FOOTPRINTS

PRIORITY

This application is a continuation of and claims priority to U.S. patent application Ser. No. 17/951,717, filed Sep. 23, 2022, and titled Mobile Signal Based Building Footprints, which is incorporated by reference in its entirety herein. U.S. patent application Ser. No. 17/951,717, in turn, is a continuation of and claims priority to U.S. patent application Ser. No. 16/714,115, filed Dec. 13, 2019, and titled Mobile Signal Based Building Footprints, which is incorporated by reference in its entirety herein.

TECHNICAL FIELD

This disclosure relates to communication systems. More particularly, this disclosure relates to determining building footprints using signal information obtained from mobile communication devices.

BACKGROUND

Recent decades have brought tremendous advances in communication systems. These advances have enabled the global proliferation of smartphones, tablets, laptops and many other mobile communication devices. Today, mobile devices incorporate WiFi, cellular, Bluetooth, NFC communication systems, and GPS capability in a single device in the pocket of almost every individual, almost all of the time. Improvements in signal processing approaches for mobile communication devices will further enhance the usefulness of the devices.

BRIEF DESCRIPTION OF THE DRAWINGS

FIG. 3A shows a view of an example of the signal processing system estimating a footprint for a target building.

FIG. 3B shows a second view of the example of the signal processing system estimating a footprint for a target building of FIG. 3A.

DETAILED DESCRIPTION

Important technical problems pose a challenge to determining and verifying the surface space occupied by physical structures. As examples, the technical problems include accurately determining the extent of the physical structure given uncertainty in information about the environment near the structure. Some of the uncertainty stems from map providers themselves, who may have incorrect or inaccurate data. An additional technical problem is how to improve or refine the determination responsive to a wide variety of inputs that could potentially give insight into the building footprint. For instance, signal information, such as horizontal position of a mobile device, is often erroneous and does not immediately lend itself as an aid to determining the building footprint. The signal processing system and techniques described below solve these and other technical problems.

Figure 1A:
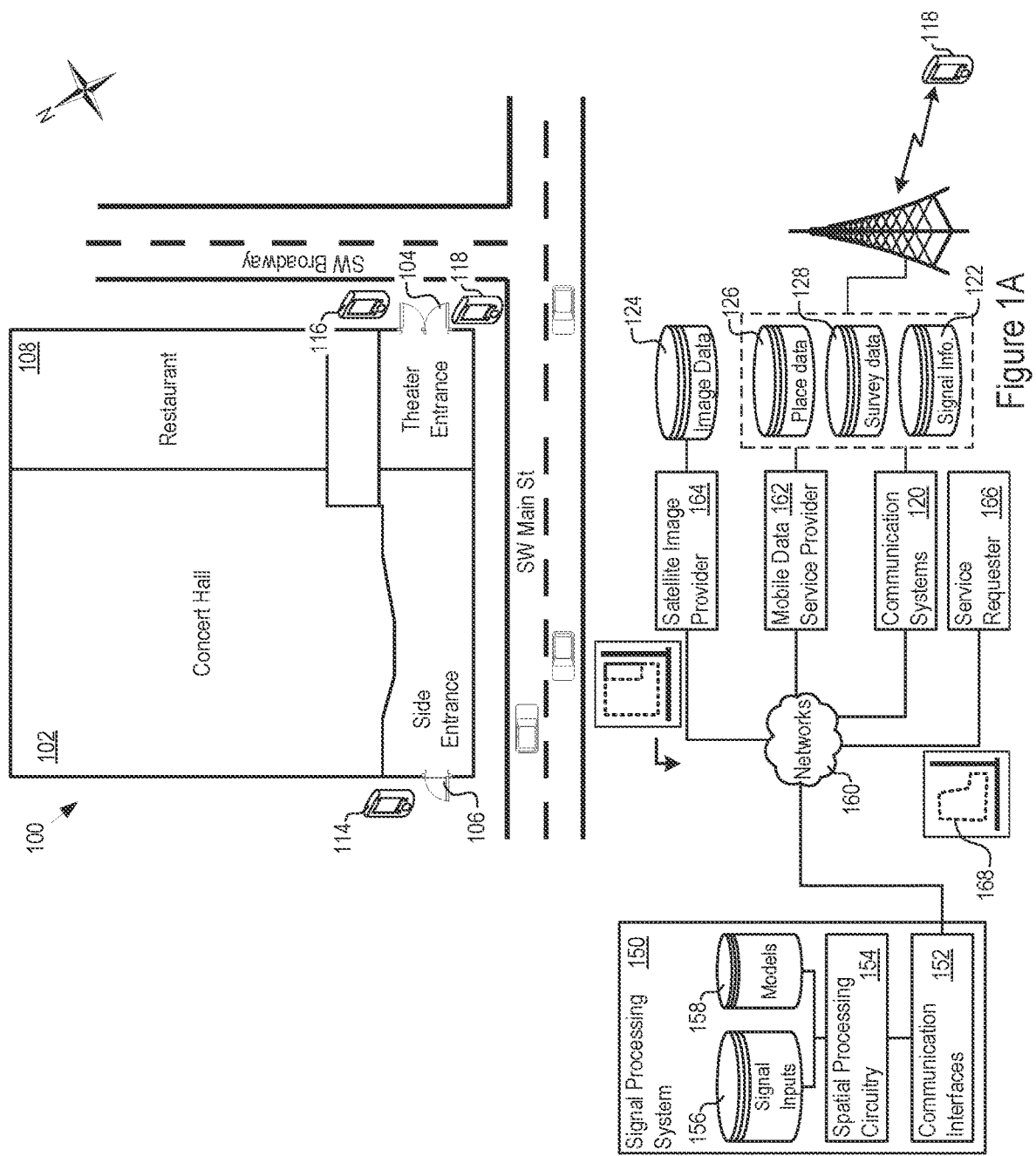
FIG. 1A shows a view of an example environment including a concert hall that has a specific building footprint, and a signal processing system which will estimate the building footprint using signal information from mobile communication devices.
Figure 1B:
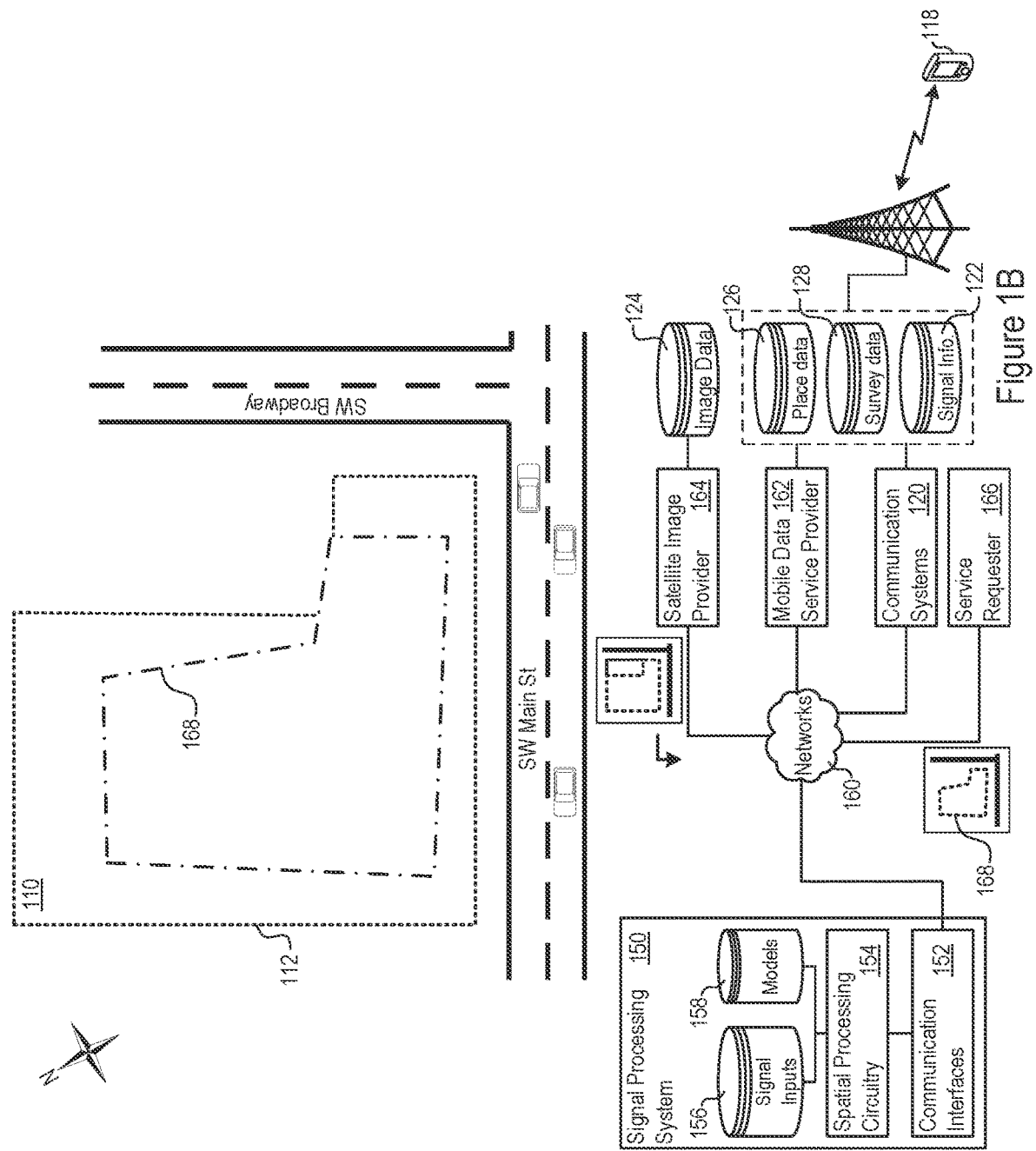
FIG. 1B shows a second view of the example environment of FIG. 1A including a concert hall that has a specific building footprint, and a signal processing system which will estimate the building footprint using signal information from mobile communication devices.

FIGS. 1A and 1B show an example environment 100 for which a signal processing system 150 estimates the footprint of a target building. In this particular example the environment 100 the target building is a concert building 110. The concert building 110 includes a concert hall 102 with main entrance 104 and side entrance 106. The main entrance 104 and side entrance 106 lead to the concert hall 102 itself. The concert hall 102 is adjacent to a restaurant 108. The concert building 110 occupies a definite surface space that is the actual physical footprint 112 of the concert building 110.

In the example of FIGS. 1A and 1B, the environment 100 includes the mobile devices 114, 116, and 118 that move along arbitrary routes into, through, and out of the environment 100, e.g., as people holding smartphones pass by the concert building 110, or as individuals arrive, enter, and later leave the concert hall 102. There may be any number of mobile devices providing signal information as inputs to the system. In addition, the mobile devices 114-118 may take a wide variety of forms, as examples: smartphones, smartwatches, tablets, laptops, or other mobile entities. The wireless transmitters in the mobile devices 114-118 transmit signal information to various receivers, including base stations, WiFi access points, and other mobile devices. With the signal information, mobile device location and timing along the routes may be analyzed, enhanced, corrected, or interpolated by a wide variety of communication systems 120, e.g., cellular service providers. That is, the communication systems 120 receive and process signal information 122 from the mobile devices, e.g., via global positioning system (GPS) transceivers, WiFi transceivers, cellular base station transceivers, manual location and reporting, or in other manners. The communication systems 120 may transmit the signal information as received or as processed to the signal processing system 150.

The signal processing system 150 estimates the actual physical footprint of a target, e.g., the actual physical footprint 112 of the concert building 110. The description below provides several examples of the architecture and processing logic of the signal processing system 150 with respect to the concert building 110. Note, however, that the signal processing system 150 may vary extensively in implementation. Similarly, the signal processing system 150 may analyze any particular target in any given environment.

In one implementation, the signal processing system 150 includes communication interfaces 152, spatial processing circuitry 154, and signal inputs 156. The signal inputs 156 may include, as examples, the signal information 122, satellite image data 124, place data 126, survey data 128, or other signal inputs. The signal information 122 may include data elements such as mobile advertising identifiers (MAIDs) assigned to mobile devices, known or interpolated mobile device paths and positions (e.g., longitude and latitude), time and position of mobile device dwell, timestamps, measured or estimated error in position accuracy (e.g., horizontal accuracy), altitude, and heading. The satellite image data 124 may include image captures that show the environment 100, such as the top of the concert building 110 and the surrounding geography. The place data 126 may include data elements such as place name, centroid, bounding polygon, floor, and hours of operation of establishments in the area. The survey data 128 may include data elements that report on visitation to specific establishments, including a mobile advertising ID, visitation place name, visitation place address, time of visit, and visit intent.

In some implementations the signal processing system 150 may build, maintain, and apply spatial processing models 158. These models may reside in any local or cloud-connected data storage to which the signal processing system 150 has access. The spatial processing models 158 help the signal processing system 150 determine an estimate of a building footprint and to determine visitation probabilities. Several examples of spatial processing models 158 are described in more detail below, including: a classification model that capture probability of visitation of a particular establishment, a point location model that help identify movement patterns, and a horizontal accuracy model that captures patterns of change in error, e.g., horizontal accuracy. With the horizontal accuracy model, the signal processing system 150 actually leverages error as a source of truth about the environment 100.

The spatial processing circuitry 154 connects through the communication interfaces 152 and networks 160 to any desired data sources. The signal processing system 150 may thereby obtain the signal inputs 156, or supplement the signal inputs 156 that the signal processing system 150 already has. For instance, the spatial processing circuitry 154 may receive signal information 122 originating from mobile devices that are in or that were in the environment 100. Data providers such as cellular service providers (represented in FIGS. 1A and 1B by the communication systems 120), mobile data service providers 162, or other sources of data may transmit the signal information 122 to the signal processing system 150. Similarly, the signal processing system 150 may receive place data 126 and survey data 128 from the communication systems 120, the mobile data service provider 162, or other entities. Satellite image data 124 for the environment 100 is available from the satellite image provider 164, among other sources.

The signal processing system 150 may also communicate with service requesters 166. The service requesters 166 may represent, for instance, systems or organizations which have requested that the signal processing system 150 provide building footprint approximations. In response to these requests, the signal processing system 150 transmits communicate footprint approximations 168 to the service requesters 166. The footprint approximations 168 may take the form of geographic information system (GIS) data, images, textual descriptions, map data, or other representations of the footprint approximation that the signal processing system 150 has determined for the requested building.

Figure 2:
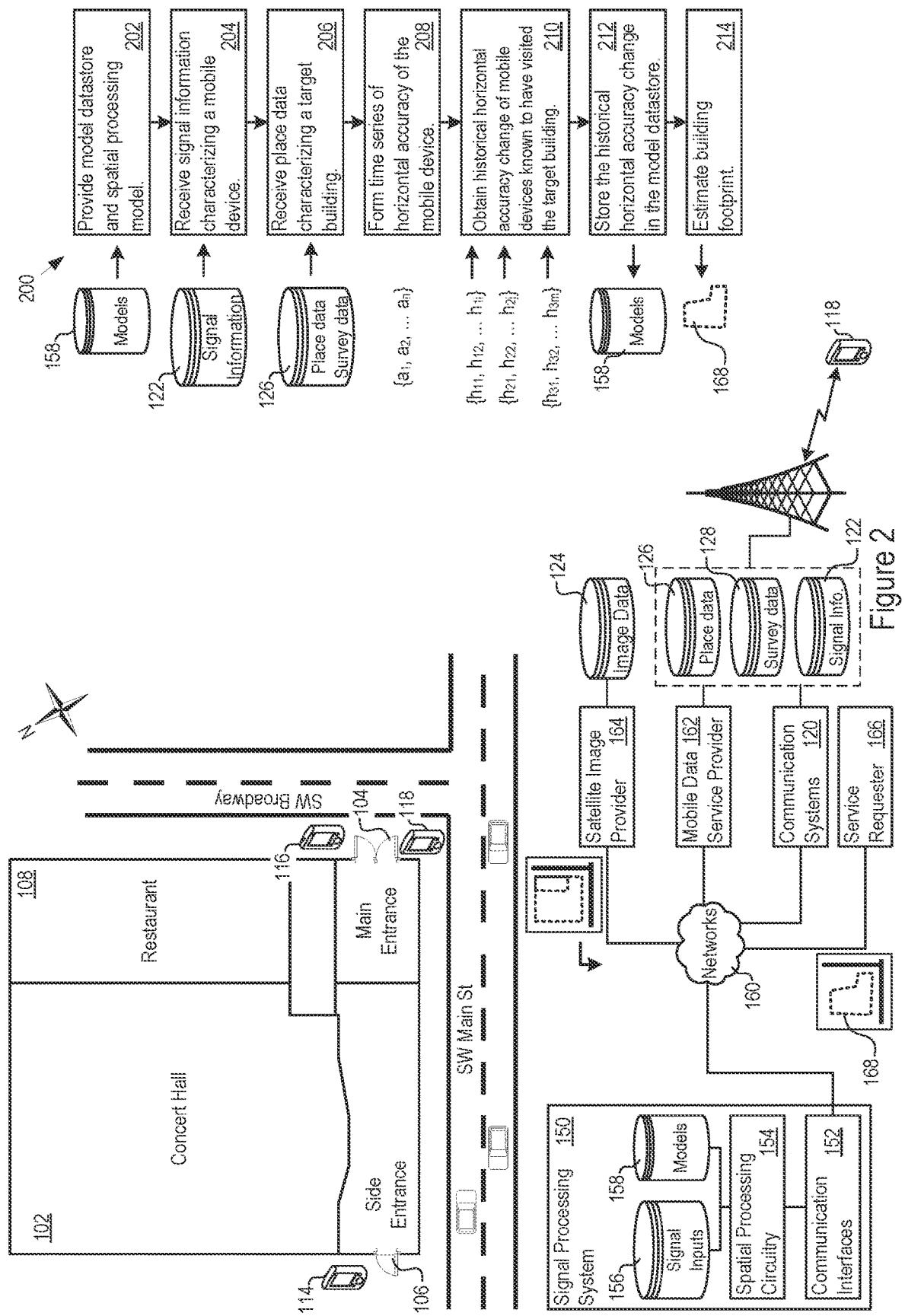
FIG. 2 shows an example of the operational logic of the signal processing system.

FIG. 2 shows one example operational logic 200 of the signal processing system 150. In this example, the signal processing system 150 takes advantage of error in location to estimate a building footprint. Other approaches are described below, and the signal processing system 150 may use the other approaches alone or in combination to determine building footprint estimates. As noted above, the signal processing system 150 provides a model datastore configured to store a spatial processing model (202). With spatial processing circuitry 154, the signal processing system 150 receives signal information characterizing a mobile device (204). For instance, the signal information may include error in position accuracy of the mobile device over time, e.g., at multiple specific instants in time.

The signal processing system 150 also receives place data 126 characterizing a target building (206). The place data 126 may include GIS data, image data, or other map or geographic data characterizing the environment 100 of the mobile device and the target building (in this example the concert building 110) for which the signal processing system 150 will estimate a footprint. As further examples, the place data 126 may specify establishments in the vicinity of the mobile device, their hours of operation, type of establishment, and the like.

The signal processing system 150 employs error in position accuracy as a source of truth about the environment 100 in which the mobile device moves. One example of error in position accuracy is the error in horizontal location of the mobile device. The error in horizontal location may be measured or otherwise determined by the communication systems 120 and included in the signal information 122, for instance. More specifically, the error in position accuracy may include amplitude and duration of error in horizontal location of the mobile device.

In some implementations, the signal processing system 150 may form a time series of horizontal accuracy of the mobile device from the error in position accuracy of the mobile device received in the signal information (208). As part of its analysis, the signal processing system 150 may compare the time series of horizontal accuracy of the mobile device to known visits to the target building. More particularly, the spatial processing circuitry 154 may obtain historical horizontal accuracy change of mobile devices known to have visited the target building (210) and store the historical horizontal accuracy change in the model datastore (212).

The spatial processing circuitry 154 may estimate the building footprint (214) in several ways. For instance, the spatial processing circuitry 154 may apply the spatial processing model to the error in position accuracy of the mobile device over time and to the place data, as well as to the image data 124 and survey data 128 when available. More particularly, the signal processing circuitry 154 may compare the time series of horizontal accuracy of the mobile device to the historical horizontal accuracy change of the mobile devices known to have visited the target building. In this respect, the spatial processing circuitry 154 may make specific inferences responsive to the signal information characterizing the mobile device. As examples, the spatial processing circuitry 154 may: infer approach of the mobile device to the target building responsive to increase in the error in position accuracy; infer departure of the mobile device from the target building responsive to decrease in the error in position accuracy; and infer dwell time of the mobile device in the target building while the error in position accuracy remains above a predefined threshold. Accordingly, as error changes, the spatial processing circuitry 154 may make a correlation to proximity to the target building, and thereby to the footprint of the target building.

In the implementation described above, the spatial processing circuitry 154 compares the time series of the horizontal accuracy of the mobile device with the time series of horizontal accuracy of other mobile devices known to have visited the target building. The spatial processing circuitry 154 and spatial processing models 158 may anticipate a decrease in horizontal accuracy (or an increase in horizontal error) as mobile device approach the target building or other area of interest, and an increase in accuracy as mobile devices depart areas of interest. The spatial processing circuitry 154 and spatial processing models 158 may assume that as a mobile device remains within the target building, the horizontal accuracy remains low (and horizontal error remains high). Accordingly, the spatial processing circuitry 154 may compare patterns of error change (e.g., including amplitude and duration) to classify a visit using signal processing methods such as cross-correlation, or image recognition methods such as convolutional neural networks.

It was noted above that the spatial processing circuitry 154 actually takes advantage of error in the signal information 122 to determine facts about the environment 100. In this respect, the error (e.g., the error in horizontal accuracy) in the signal information 122 from the mobile device is not random. Instead, the error changes according to many predetermined factors, such as the time of day, building materials, terrain heights, and elevation of the mobile device. Instead of treating error as a disadvantage and excluding erroneous data points, the spatial processing circuitry 154 incorporates the error as another source of information in the spatial processing models 158. In doing so, the spatial processing circuitry 154 builds much more informative models for mobile devices visiting places in the physical world. The spatial processing models 158 facilitate mapping the probabilistic footprint of a location, based on where mobile devices report their position and the associated error in horizontal accuracy with validated, known, visits.

There are several types of suitable spatial processing models 158. For instance, a probabilistic model may include a 4-dimensional probability distribution over a predetermined environment surrounding the target building. The probabilistic model incorporates a time component, as the level of GPS accuracy is correlated to the position of the GPS satellites over time. The spatial processing circuitry 154 may form the probabilistic model by obtaining individual observations that occur when a mobile device is reported as visiting the target building. These observations arrive in the signal information 122 and provide a distribution over longitude, latitude, time of day, and reported dilution of precision that topologically covers the most likely reported positions for mobile devices that are visiting, as well as the most commonly reported error magnitudes.

The spatial processing circuitry 154 may also construct a classification model of the probability of visitation by a given mobile device to a particular target building. The classification model may include, as examples, the reported position of the mobile device, time of day, and the horizontal accuracy. The classification model may incorporate, as a response variable, the results of surveys administered to mobile devices, e.g., those mobile devices in the vicinity of the target building. The spatial processing circuitry 154 may then apply one or more models in a suite of models to estimate the probability of visit to the target building or any given business in the target building. As several examples, the suite of models may include logistic regression, tree-based classifiers, and Bayesian probabilistic models.

Note also that the spatial processing circuitry 154 may construct establishment visitation footprints using the visitation probability distributions. The shape of an establishment visitation footprint will change during different segments of the day. For instance, the establishment visitation footprint will be different during business hours and after hours, and will change over time from the morning to the afternoon. Establishment visitation footprints may provide a more accurate foot traffic count compared to, for instance, counting mobile devices that simply fall into the geometric polygon or geofencing of a building given its latitude and longitude.

In other implementations, the spatial processing circuitry 154 analyzes sequences of point locations, headings, or both. The spatial processing circuitry 154 labels each sequence according to whether or not the sequence indicates a visit to the target building. To that end, the spatial processing circuitry 154 links the point locations or headings in chronological order into sequences of a specific length as mobile devices approach the area of interest until they leave the area of interest. The spatial processing circuitry 154 may submit the sequence of locations or headings to, e.g., a recurrent neural network or convolutional neural network to identify the movement pattern for a visitation signal.

FIGS. 3A and 3B show an example 300 of the signal processing system 150 estimating the footprint for a location in the environment 100 of the mobile device 302. Again, in this example, the footprint estimation will be for a target building, namely the concert building 110. The signal processing system 150 analyzes the signal inputs 156 with the spatial processing models 158 to accurately generate a footprint estimate 314 as described in more detail below. As an added advantage, the estimated footprint is highly predictive of the mobile device 302 visiting the location, e.g., attending a concert in the concert hall 102.

In this example, the spatial processing circuitry 154 associates the MAID for the mobile device 302 to mobile device paths that are within predefined thresholds spatially and temporally to the target building (350). Using the MAID helps ensure anonymity for the mobile device 302. The spatial processing system 154 may interpolate the path and position of dwell for the mobile device 302 in proximity of the target building (352). Optionally, the spatial processing circuitry 154 constructs a visitation model that predicts the probability of a visit by the mobile device 302 to the target building given the building polygon, the approach and exit paths, and the dwell time for the mobile device 302 (354) in and around the building and surrounding environment 100. In one implementation, the signal processing system 150 refines the visitation model by analyzing survey answers available in the signal inputs 156. The survey answers may confirm or deny visitation by a given mobile device to any specific building.

To estimate the building footprint, the spatial processing circuitry 154 may build a geometric model of the signal field for the target building (356). FIGS. 3A and 3B show an example geometric model 304. The geometric model 304 includes specific zones. Each zone may represent a probability density of a visit by the mobile device to the zone, based, e.g., on dwell time in the zone or other signal information. In this example, FIGS. 3A and 3B show a central zone 306 and a periphery zone 308. The central zone 306 corresponds to dwell time within a predefined dwell time window in the concert hall 102, and captures mobile devices stationary in the concert hall 102. The periphery zone 308 corresponds to dwell time within a different, shorter, predefined dwell time window and captures mobile devices moving in and out through the side entrance 106 and main entrance 104.

The geometric model 304 may also include vector fields that show known entry paths and exit paths (captured, e.g., in the place data 126 or image data 124) followed by mobile devices during confirmed visits to the target building. In FIGS. 3A and 3B, the vector field 310 shows entry and exit through the side entrance 106 and the vector field 312 shows entry and exit through the main entrance 104. In one implementation, the spatial processing circuitry 154 estimates the building footprint (358) by determining a bounding shape around zones above a predefined probability density. The spatial processing circuitry 154 may refine the footprint estimate by correcting with, e.g., satellite image data 124 that is known to be recent or reliable. In this example, the spatial processing circuitry 154 has determined the estimated building footprint 314 for the target building as a polygon surrounding zones with dwell time exceeding a predefined inclusion threshold. In particular, the building footprint 314 surrounds the two zones 306 and 308 and is an approximation to the actual physical footprint 112 of the concert hall 110. For predicting probability of visitation, the spatial processing circuitry 154 may take the vector fields 310 and 312 into consideration by noting when they indicate approach or departure of the mobile device to the target building, and in particular approach to or departure from known exits and entrances.

Figure 4:
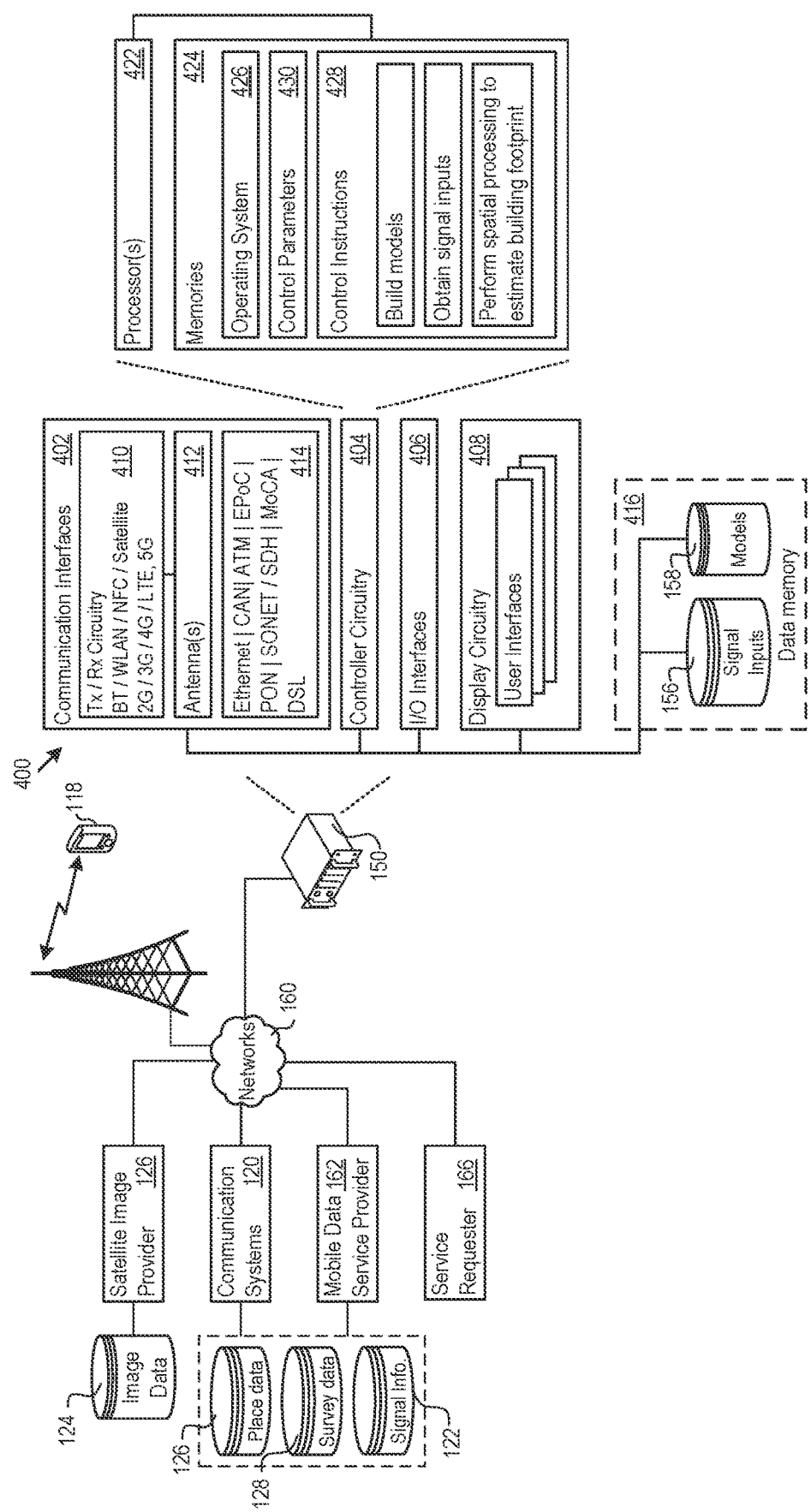
FIG. 4 shows an example implementation of the signal processing system.

FIG. 4 shows an example implementation 400 of the signal processing system 150. The implementation 400 includes communication interfaces 402, controller circuitry 404, input/output (I/O) interfaces 406, and display circuitry 408. The controller circuitry 404 may include any combination of hardware, software, firmware, or other circuitry. The controller circuitry 404 may be implemented, for example, with one or more systems on a chip (SoC), application specific integrated circuits (ASIC), microprocessors, microcontrollers, discrete analog and digital circuits, and other circuitry. The controller circuitry 404 is part of the implementation of any desired functionality in the signal processing system 150. Accordingly, the controller circuitry 404 may implement the operational logic 200 described above in FIG. 2, for example. The signal processing system 150 may store and retrieve data from data memories 416. For instance, the data memories 416 may store the signal inputs 156 and the spatial processing models 158.

The display circuitry 408 and the I/O interfaces 406 may include a graphical user interface, touch sensitive display, voice or facial recognition inputs, buttons, switches, speakers and other user interface elements. Additional examples of the I/O interfaces 406 include Industrial Ethernet, Universal Serial Bus (USB), Serial Advanced Technology Attachment (SATA), and Peripheral Component Interconnect express (PCIe) interfaces and connectors, memory card slots, and other types of inputs. The I/O interfaces 406 may further include audio outputs, magnetic or optical media interfaces (e.g., a CDROM or DVD drive), network (e.g., Ethernet or cable (e.g., DOCSIS) interfaces), or other types of serial, parallel, or network data interfaces.

The communication interfaces 402 may include transceivers for wired or wireless communication. The transceivers may include modulation/demodulation circuitry, digital to analog converters (DACs), shaping tables, analog to digital converters (ADCs), filters, waveform shapers, filters, preamplifiers, power amplifiers and/or other circuitry for transmitting and receiving through a physical (e.g., wireline) medium such as coaxial cable, Ethernet cable, or a telephone line, or through one or more antennas. Accordingly, Radio Frequency (RF) transmit (Tx) and receive (Rx) circuitry 410 handles transmission and reception of signals through one or more antennas 412, e.g., to support Bluetooth (BT), Wireless LAN (WLAN), Near Field Communications (NFC), and 2G, 3G, 4G/Long Term Evolution (LTE), and 5G communications.

Similarly, the non-wireless transceivers 414 may include electrical and optical networking transceivers. Examples of electrical networking transceivers include Profinet, Ethercat, OPC-UA, TSN, HART, and WirelessHART transceivers, although the transceivers may take other forms, such as coaxial cable network transceivers, e.g., a DOCSIS compliant transceiver, Ethernet, and Asynchronous Transfer Mode (ATM) transceivers. Examples of optical networking transceivers include Synchronous Optical Networking (SONET) and Synchronous Digital Hierarchy (SDH) transceivers, Passive Optical Network (PON) and Ethernet Passive Optical Network (EPON) transceivers, and EPON Protocol over Coax (EPoC) transceivers.

Note that the control circuitry 404 may include one or more controllers 422, e.g., microprocessors, microcontrollers, FGPAs, GPUs, and memories 424. The memory 424 stores, for example, an operating system 426 and control instructions 428 that the controller 422 executes to carry out desired functionality for the signal processing system 150. Accordingly, the control instructions 428 may implement the footprint estimation logic described above, e.g., the logic 200 shown in FIG. 2. The control parameters 430 provide and specify configuration and operating options for the control instructions 428.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
a model datastore configured to store a spatial processing model; and
spatial processing circuitry configured to:
obtain a position accuracy for a mobile device at multiple instants in time;
based on the position accuracy of the mobile device at the multiple instants in time, determine a change in the position accuracy of the mobile device;
receive place data characterizing a target building in an environment of the mobile device; and
estimate a building footprint for the target building by applying the spatial processing model to the change in the position accuracy of the mobile device and to the place data,
where the spatial processing model is configured to infer a distance change of the mobile device relative to the target building based on the change in the position accuracy.

2. The system of claim 1, where:
the position accuracy is based on error in horizontal location of the mobile device.

3. The system of claim 1, where:
the position accuracy is based on an amplitude and duration of error in horizontal location of the mobile device.

4. The system of claim 1, where:
the spatial processing circuitry is further configured to form a time series of horizontal accuracy of the mobile device from an error in position accuracy of the mobile device at multiple instants in time.

5. The system of claim 4, where:
the spatial processing model is configured to compare the time series of horizontal accuracy of the mobile device to known visits to the target building.

6. The system of claim 4, where
the spatial processing circuitry is further configured to:
obtain historical horizontal accuracy change of mobile devices known to have visited the target building; and
store the historical horizontal accuracy change in the model datastore.

7. The system of claim 6, where:
the spatial processing model is configured to compare the time series of horizontal accuracy of the mobile device to the historical horizontal accuracy change of the mobile devices known to have visited the target building.

8. The system of claim 1, where:
the spatial processing model is configured to:
infer an approach of the mobile device to the target building responsive to decrease in the position accuracy; and
infer departure of the mobile device from the target building responsive to increase in the position accuracy.

9. The system of claim 8, where:
the spatial processing model is configured to:
infer dwell time of the mobile device in the target building while the position accuracy remains below a predefined threshold.

10. A signal processing method comprising:
providing a model datastore configured to store a spatial processing model; and
with spatial processing circuitry:
obtaining a position accuracy for a mobile device at multiple instants in time;
based the position accuracy for the mobile device at the multiple instants in time, identifying a change in the position accuracy of the mobile device;
receiving place data characterizing a target building in the environment of the mobile device;
estimating a building footprint for the target building by applying the spatial processing model to the change in position accuracy for the mobile device and the place data; and
inferring, with the spatial processing model, a distance change of the mobile device relative to the target building based on the change in the position accuracy.

11. The method of claim 10, where:
the position accuracy is based on error in horizontal location of the mobile device.

12. The method of claim 10, where:
the position accuracy is based on an amplitude and duration of error in horizontal location of the mobile device.

13. The method of claim 10, further comprising:
with the spatial processing circuitry, forming a time series of horizontal accuracy of the mobile device from the position accuracy for the mobile device at multiple instants in time.

14. The method of claim 13, further comprising:
comparing the time series of horizontal accuracy of the mobile device to known visits to the target building.

15. The method of claim 13, further comprising:
with the spatial processing circuitry:
obtaining historical horizontal accuracy change of mobile devices known to have visited the target building; and
storing the historical horizontal accuracy change in the model datastore.

16. The method of claim 15, further comprising:
comparing the time series of horizontal accuracy of the mobile device to the historical horizontal accuracy change of the mobile devices known to have visited the target building.

17. The method of claim 10, where inferring the distance change of the mobile device relative to the target building includes:
inferring approach of the mobile device to the target building responsive to increase in an error in position accuracy; and
inferring departure of the mobile device from the target building responsive to decrease in the error in position accuracy.

18. The method of claim 17, further comprising:
inferring dwell time of the mobile device in the target building while the error in position accuracy remains above a predefined threshold.

19. A signal processing system comprising:
means for providing a model datastore configured to store a spatial processing model; and means for obtaining a position accuracy for a mobile device at multiple instants in time;

means for based the position accuracy for the mobile device at the multiple instants in time, identifying a change in the position accuracy of the mobile device;

means for receiving place data characterizing a target building in the environment of the mobile device; and means for estimating a building footprint for the target building by applying the spatial processing model to the change in position accuracy for the mobile device and the place data.

20. The signal processing system of claim 19, further including:

means for inferring approach of the mobile device to the target building responsive to a decrease in the position accuracy;

means for inferring departure of the mobile device from the target building responsive to increase in the position accuracy; and means for inferring dwell time of the mobile device in the target building while the position accuracy remains below a predefined threshold.

\* \* \* \* \*